V. E. BEAGLE.
HOISTING TRUCK.
APPLICATION FILED AUG. 17, 1921.
1,437,583.
Patented Dec. 5, 1922.
3 SHEETS—SHEET 1.
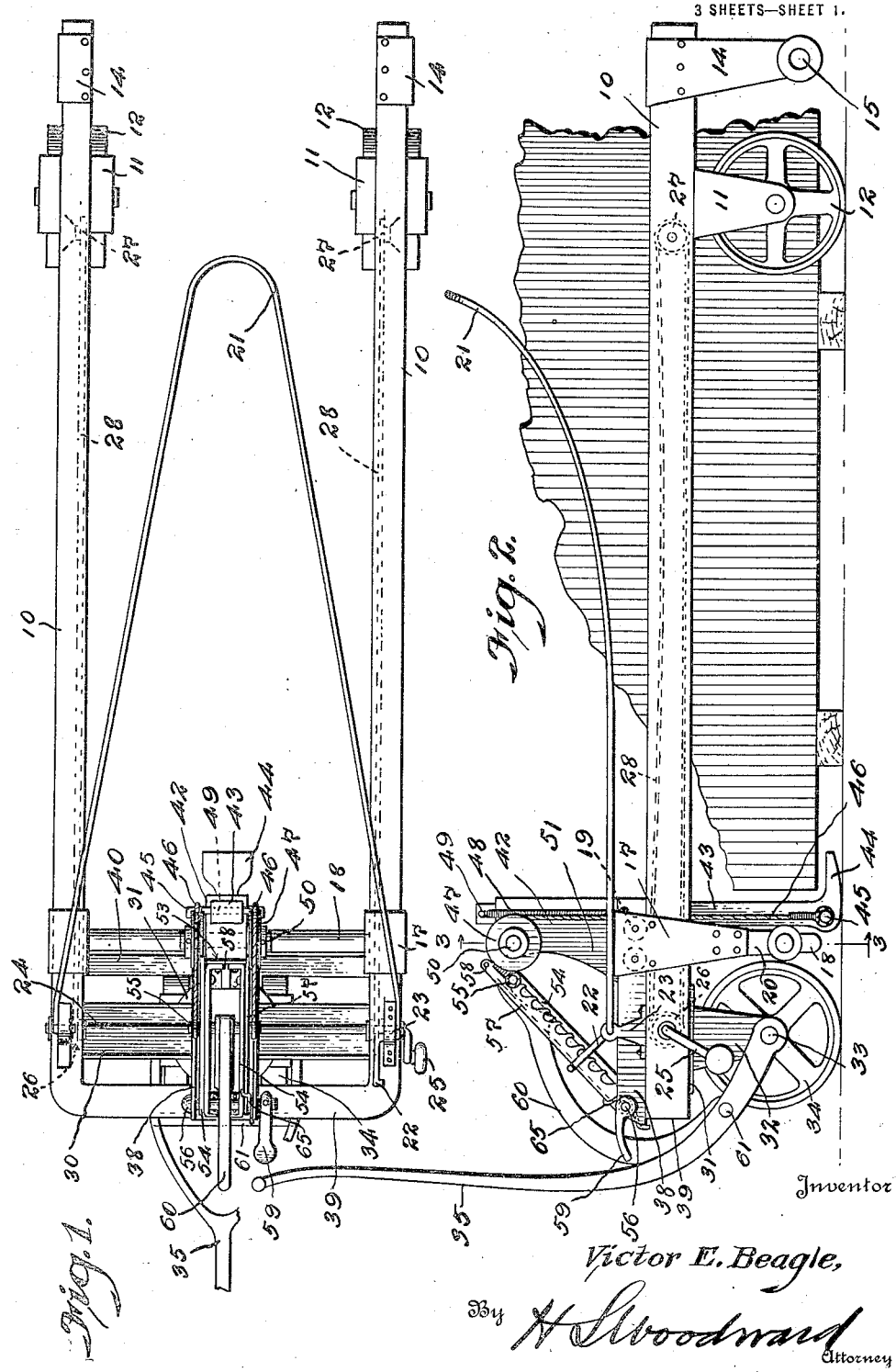
Inventor
Victor E. Beagle,
By H. S. Woodward
Attorney

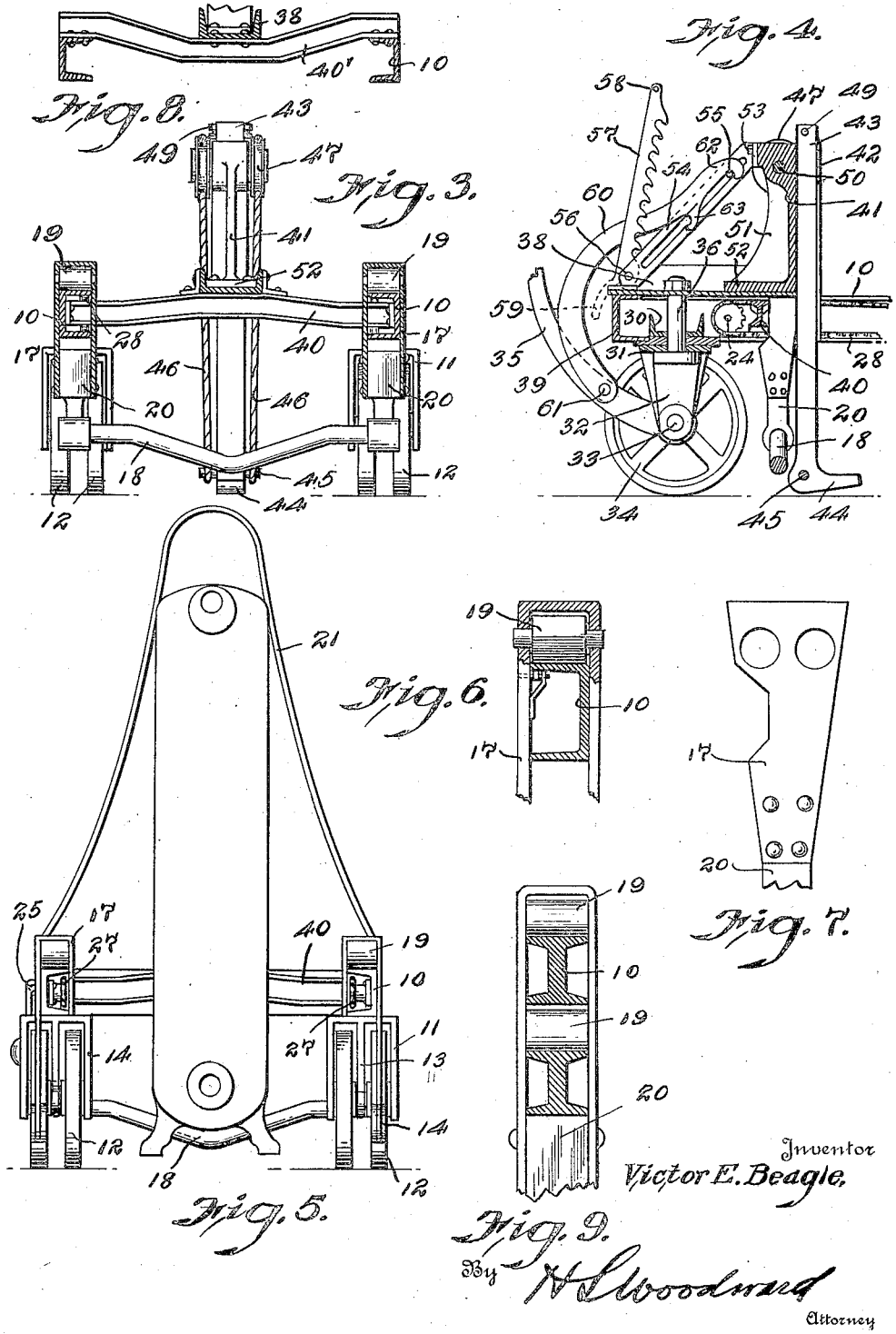

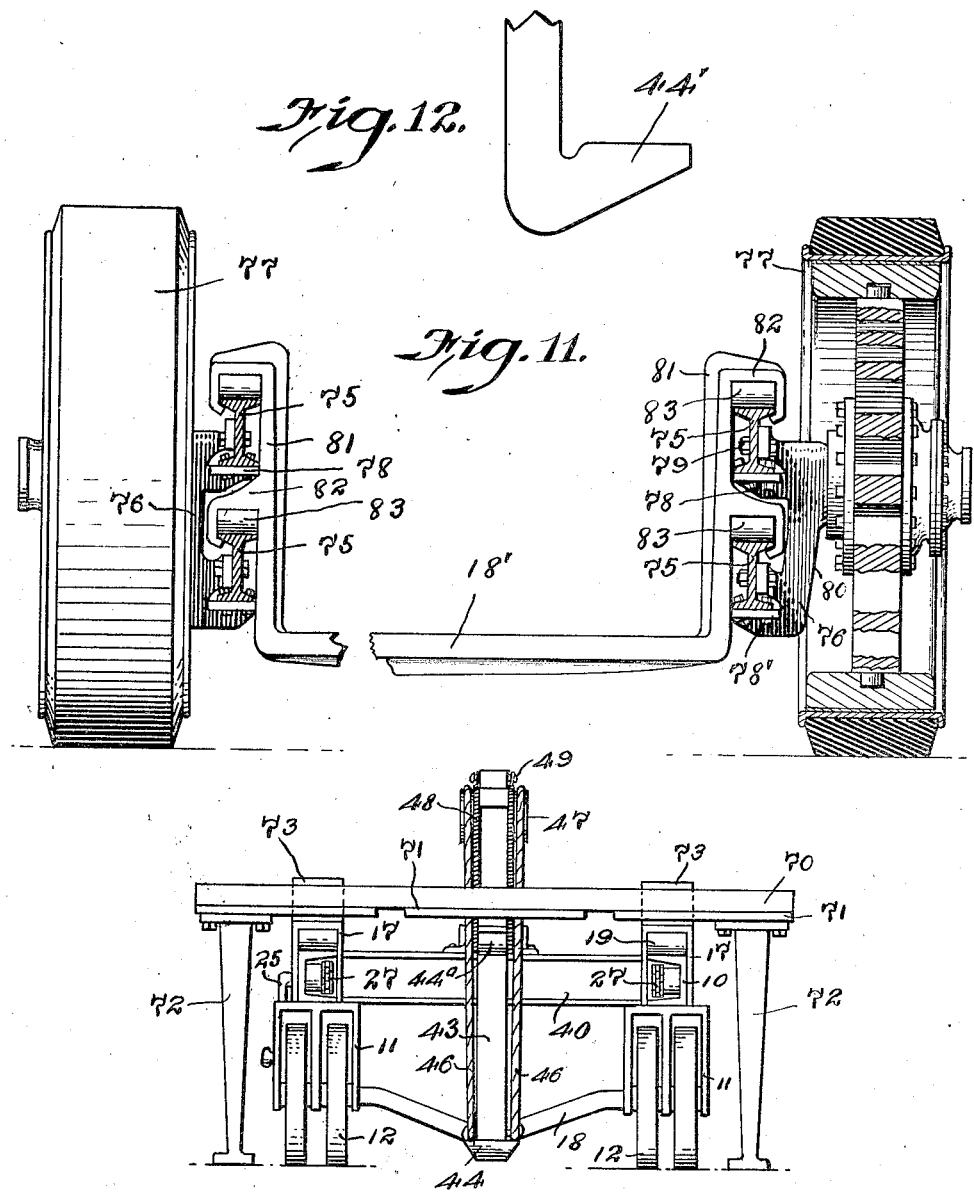

Patented Dec. 5, 1922.

1,437,583

UNITED STATES PATENT OFFICE.

VICTOR E. BEAGLE, OF ALEXANDRIA, VIRGINIA.

HOISTING TRUCK.

Application filed August 17, 1921. Serial No. 493,059.

*To all whom it may concern:*

Be it known that I, VICTOR E. BEAGLE, a citizen of the United States, residing at Alexandria, in the State of Virginia, have invented certain new and useful Improvements in Hoisting Trucks, of which the following is a specification.

The invention has for an object to effect improvements in hoisting trucks of the type illustrated in my patents numbered 1,186,876 issued June 13, 1916; 1,230,839 issued June 26, 1917; and 1,364,234 issued January 4, 1921, and it is a purpose particularly to effect improvements in constructions whereby handling of the truck is facilitated and its action improved, as well as to adapt it to general and special uses with great advantage.

It is a particular object of the invention to provide a novel and desirable means for rapidly elevating a load, in such manner that the operator is not required to leave the head of the truck. It is also an aim to provide a novel and efficient jacking device adapted to be operated by the handle of a truck utilized as a draft and steering means.

A further aim is to effect improvements in the frame construction of such a truck.

Additional objects, advantages and features of invention reside in the construction, arrangement and combination of parts involved, as will be understood from the following description and accompanying drawings, wherein, Figure 1 is a top plan view of a truck constructed in accordance with my invention, Fig. 2 is a side elevational view thereof, Fig. 3 is a cross sectional view on the line 3—3 of Fig. 2, Fig. 4 is a fragmentary longitudinal sectional view at the front part of the truck, Fig. 5 is a rear end elevation of the truck with a radiator loaded thereon, Fig. 6 is a fragmentary cross sectional view of the frame and a carriage element, Fig. 7 is a side view of one of the carriage elements, Fig. 8 is a fragmentary cross sectional view of a modified mounting for the jack element, Fig. 9 is a view similar to Fig. 6, showing a modification of the frame, Fig. 10 is a rear elevation of my truck, in association with a loading platform, movable by my truck, Fig. 11 is a cross sectional view of a modification of the truck looking toward the rear.

Fig. 12 is a modification of the jack foot.

There is illustrated a truck which comprises essentially a U-shaped frame 10 open at the rear, and having brackets 11 fixed upon its side elements adjacent the rear, each of which carries two parallel wheels suitably spaced and positioned for the service intended. The frame in the present instance is shown as constructed of channel iron, the end portions being bent into parallel to form the side members of the frame. The truck elements 11 may be of any suitable construction, but in the present instance are U-shaped members of sheet metal having their bight portions riveted to the under side of the frame, the downwardly extending arms having a shaft mounted therein upon which the wheels revolve. Immediately to the rear of these brackets there is riveted to each side member, a hanger 14, the two having alined openings 15 in their lower ends, through which a bar may be inserted through both hangers to provide a rest for work when elevated, if this be found necessary. Upon each of the side members of the frame 10 there is mounted a carriage, element 17, and the two carriage elements support therebetween a load supporting saddle bar 18, by which they are held in rigid mutual relation. Each carriage comprises a U-shaped body member of sheet metal between the sides of which adjacent the bight there are mounted rollers 19, traveling upon the upper side of the frame. Secured between the lower ends of the sides there are forgings 20 the lower parts of which have the bar 18 secured therein in a suitable manner. Upon the forward end of the frame 10 at the upper side, there is mounted a load brace 21, which I have formed of a half inch rod of resilient steel arranged to receive the upper part of the load therewithin, being pivoted so as to swing rearwardly and downwardly to receive the load therein. It is formed with the sides convergent toward the outer part, and it may also be curved forwardly at its outer part, which has the effect of making its engagement with a radiator more secure by the converging portions fitting in between the sections of the radiator. The load brace is formed with a forwardly extending leg 22 at the lower end, arranged to strike upon the frame when the brace has been moved forward a sufficient distance to be retained in elevated position by gravity. This leg may be formed by turning forwardly one end portion of the bar of which the brace 21 is formed, inwardly of the support 23, by which the brace is mounted, or a leg may be attached, as desired.

For moving the carriage elements 17, there is mounted across the front end of the truck a shaft 24, having a crank 25 at its outer end provided with a knob for manual operation, whereby it may be rotated, and the shaft has mounted thereon within the channels of the sides of the frame, sprockets 26, while at the rear end similar sprockets 27 are mounted, at each side. A chain 28 is provided at each side, which is extended around both sprockets, and connected to the respective carriage, whereby operation of the crank 25 will move the carriages simultaneously, as will be understood.

Across the forward part of the frame 10 closely within the bight thereof, and at the lower side, there is fixed a channel beam 30, the flanges of which are disposed upwardly, and on the underside of the beam 30 there is mounted a fifth wheel 31 bearing upon a U-shaped castor yoke 32 through the lower part of which there is extended a shaft 33, upon which two wheels 34 are revolubly mounted. The ends of the shaft 33 project and have pivoted thereon the forked lower end of the combined hoist lever, draft and steering tongue and lever 35, details of which will be subsequently described. Between the wheels 34, the shaft is engaged through a combined king pin and stud bracket 36, which engages against the inner side of the head of the yoke 32, and has a reduced portion extended through the head of the yoke and revolubly through the plate 31 and beam 30 and suitably secured thereabove. In the present instance, the reduced portion is also extended through a central longitudinally arranged channel beam 38, and has a nut engaged thereon by which it is secured in place. The beam 38 rests at its forward end upon the head 39 of the frame 10, and spaced a short distance above the beam 30; its rear part resting upon a transverse I-beam 40, mounted between the sides of the frame 10, the channel beam 38 projecting a short distance rearwardly beyond the I-beam 40 as may be noted in Figs. 1 and 4. The I-beam 40 is so mounted in the side members of the frame 10 that the reaches of the chain 28 may pass thereover and thereunder, as may be observed in Figures 3 and 4. The beam may be mounted upon the upper side of the side members of the frame, however, as indicated in Fig. 8, where the beam 40' is formed with a dropped middle portion so that it may support the channel beam 38 of the frame 10.

Means is provided for hoisting the forward end of a load when the truck is backed into position around the load, in accordance with the use described in the earlier patents before mentioned, the hoisting means in the present instance comprising a cast or otherwise suitably formed body frame 41, including essentially a vertical guide boxing 42, in which there is reciprocable a snugly fitted bar 43 having the foot 44 at the lower end projected rearwardly and of suitable shape for engagement under the end of a load for lifting thereof. The bar 43 is provided with trunnions 45 at each side, at its lower extremity, from which cables 46 are extended upwardly and over pulleys 47 mounted upon the upper end of the frame 41, to a draft means, as will be subsequently described, and by which means the bar 43 is raised and lowered. In order to insure proper lowering movement of the bar, springs 48 are connected to a pin 49 projected transversely through the upper end of the bar 43, and anchored in the flanges of the rear part of the channel beam, or otherwise. For the mounting of the pulleys 47, the frame 41 is provided with a suitable forward enlargement at the upper part of the boxing 42, through which a shaft 50 is passed. The frame 41 is also formed with a forwardly extending web 51 joined to a foot plate 52, by which the frame is braced, the foot plate 52 being riveted to the channel beam 38 and cross beam 40. The upper end of the frame 41 is formed with a facing at 53, against which there are bolted the upper ends of inclined guides 54, having slots extending throughout their length, their lower ends resting upon the forward end of the channel beam 38 and being riveted thereto. The ends of the guide bars 54 are bent at the proper angle and apertured to permit the securement mentioned, as may be seen in Fig. 4, and also in Fig. 1. A hoist shaft 55 is extended transversely through the slots in both of these guides, projecting at each side, and having the cables 46 secured thereto. A shaft 56 is extended revolubly through the lower parts of the guides 54 and the flanges of the beam 38 upon which there are secured two ratchet bars 57 arranged to engage and receive the shaft 55 at different points in its movement, longitudinally of the guides 54, whereby the bar 43 may be held at various elevations securely. The ratchet bars 57 are connected at their upper ends by a cross pin as at 58. The shaft 56 is headed at the left, and projected at the right a suitable distance to receive a pedal lever 59, by which the ratchet bars 57 may be operated to release the shaft 55 for lowering of the bar 43 when desired. For elevation of the bar 43, releasable connecting means between the tongue and the hoist device is provided which engages the shaft 55 and draws it downwardly in the guide, consisting of a double hook draw link 60, which is pivoted in the bifurcated lower end of the tongue 35, upon a shaft 61 mounted thereon. When the tongue 35 is in full raised position, the outermost hook 62 may engage the shaft 55 when at the upper limit of its movement in the guide 54. The link 60 is provided with a second hook 63, which, when in the position last mentioned, is located so as to engage the bar 55 when at its intermediate position in the guides 54. The link is preferably pivoted a short distance from the fulcrum of the tongue 35, which operates as a lever, and the desirable location for this connection brings it somewhat under the forward end of the frame 10. This necessitates the curving of the link 60 so that its operative movement will not be obstructed. A spring 65 is provided, engaged with the ratchet device in such manner as to hold it yieldingly in engaging position, as may be understood.

In the operation of the device, the truck being backed into position around the load as shown in Fig. 2, and the bar 43 being at the lower limit of its movement, with the foot 44 engaged under the forward end of the load, the tongue 35 is raised with a quick motion and stopped closely adjacent the upper limit of its movement, which will throw the link 60 rearwardly causing it to fall into engagement with the bar 55, as shown in Fig. 2. The tongue 35 is then operated as a lever, depressed until the shaft 55 is moved into the intermediate notch of the ratchet bar 57, and then the tongue is again raised, bringing the second hook 63 into engagement with the shaft 55 in its intermediate position, after which the tongue is again depressed, as before, and this moves the shaft 55 to its lowermost position, where it is held by the ratchet 57. The foot 44 will then have been elevated well above the level of the saddle bar 18, and the load rearwardly of its middle or center of gravity also elevated to permit engagement of the bar 18 thereunder. The crank 25 is then operated to move the bar 18 rearwardly beneath the load until it passes the center of gravity, after which the tongue 35 is depressed sufficiently to permit release of the ratchet bars 57 by depression of the pedal 59, when the load is allowed to lower at the forward end, bringing its intermediate part to bear upon the saddle bar 18, the forward end being still further lowered then, so that the rear end of the load clears the ground, after which the ratchets 57 are released to engage the shaft 55 and hold the load in this position. The tongue is then given an upward movement until the forward end of the truck frame strikes the base portion of the link 60 slightly above the shaft 61, which will throw the link 60 forwardly and out of engagement, and the tongue is quickly lowered. When the load has been moved to the desired position, the link 60 is again thrown into engaging position, and the tongue operated in conjunction with the pedal 59 to lower the load, the load is elevated at the forward end until it clears the bar 18 after which the crank 25 is operated to draw the bar 18 forwardly to initial position, and the load then lowered in successive stages as will be understood from the foregoing description, the ratchet bar 57 being utilized to hold the shaft when it reaches intermediate position, while the uppermost hook 62 is engaged therewith to permit gradual return of the shaft to its uppermost position in the guide 54.

It will be appreciated that this appliance is an especially satisfactory one for movement of objects such as upright pianos, as well as other objects, and it is also well adapted to use in moving portable platforms which may be set upon a floor and loaded for movement conveniently. For moving pianos, a straight cross bar 18', such as shown in Fig. 11 may be employed, and it may also be found desirable to shape the foot of the jack bar as illustrated at 44' in Fig. 12, in order to avoid damage to the lower edge portion of a case adjacent the finished surface.

A platform for use with my truck may be constructed as shown in Fig. 10, where a platform 70 is illustrated, formed of transverse planks secured upon longitudinal metal plates 71, one adjacent each side and one extending medially thereof, the platform being supported at the corners by legs 72 arranged to support the platform at such height that the side members of my truck frame may pass readily thereunder and within the legs, as shown in Fig. 10. The carriage elements 17 are provided with upwardly extended parts 73, which may be termed rests, and the jack bar 43 is provided with a removable upper foot piece 44ª arranged at such height as to pass readily under the medial plate 71 when the jack bar is at its lower limit of movement. The rests 73 are located at such height that when the end of the platform is raised by the foot piece 44ª to a proper height, the rest 73 may be moved rearwardly under the platform to a point beyond its middle a sufficient distance, after which lowering of the platform will bring it upon the rest and clear the legs 72 from the floor or the ground, as the case may be.

In Fig. 11, I have illustrated a method of mounting the side members of the frame in such manner that the load carrying bar may be moved rearwardly past the wheel truck members, and this may be accomplished whether there is one or two longitudinal structural elements in each side member of the frame. In the present instance, there are illustrated two longitudinal I-beams 75 comprising the side members of the frame, carried upon spindle castings 76, mounted in heavy rubber tired wheels 77, which may be of any usual construction. The spindle forgings include an upper inwardly extending bracket 78, upon which one beam 75 is mounted, and over which a bracing arm 79 is provided, against which the web of the beam 75 is secured. Beneath the bracket 78 a downwardly extending arm 80 is formed on the spindle member at the lower end of which a bracket 78' is provided, over which there is a brace 79' to which the lower beam 75 is secured as shown. The arm 80 is proportioned and inclined so that there is a clearance between it and the upper part of the beam 75, and the forging is also porportioned to receive the two beams with a sufficient clearance from the wheel 77. Carriage elements 81 are formed integrally with a load carrying bar 18', as shown, although these parts may be separately constructed if desired. The carriage elements have two similarly formed outwardly projected brackets 82, one over each of the beams 75, and including downwardly projected parts within which are mounted rollers 83, the brackets 82 engaged under the upper outer flanges of the rails 75 whereby secure and rigid relation is established between the carriage elements and the side members of the truck frame. In this way, the torque developed by a load, tending to incline the wheels 77 inwardly toward the top, is resisted by the carriage element and cross bar 18'.

What is claimed:—

1. In a truck of the character described, a frame including wheeled side members having a connecting portion therebetween at the forward extremity and an intermediate connecting portion therebetween, the space between the side members being open toward the rear, a transverse load support having a travelling mounting on the side members, a longitudinal member located medially of the frame upon said connecting portions, and projected rearwardly of the intermediate portion a distance to permit the load support to be positioned forwardly thereof at times, a lifting device upon said projected portion, and a supporting wheeled element on the frame forwardly thereof.

2. A truck frame, a vertically movable load engaging element, an anti-friction device thereadjacent at an elevation, a cable element connected to the lower part of said load engaging member and extended upwardly and forwardly over said anti-friction device, a forwardly and downwardly inclined guide element, a member slidable therein connected to the cable, a lever for operating the device, and a member pivoted thereon constructed for engagement with said slidable member at different distances from the pivot.

3. A truck body, a hoist element thereon including a frame, a vertical slidable jack bar therein having a load engaging portion, pulleys revolubly mounted at the upper part thereof, inclined guide elements extended from adjacent the pulleys forwardly and downwardly having longitudinal slots therein, a transverse member extended through the slots, cable elements connected to the jack bar at its lower part on opposite sides, extending upwardly and forwardly over said pulleys and connected to said transverse member, a pivoted double ratchet element to engage said transverse member for the purpose described, a pedal operated release therefor, a lever tongue on the truck and a connecting member on the lever constructed to engage the transverse member for draft at different distances from the lever element, for the purpose described.

4. A truck body, a hoist element thereon including a frame, a vertical slidable jack bar therein having a load engaging portion, pulleys revolubly mounted at the upper part thereof, inclined guide elements extended from adjacent the pulleys forwardly and downwardly having longitudinal slots therein, a transverse member extended through the slots, cable elements connected to the jack bar at its lower part on opposite sides, extending upwardly and forwardly over said pulleys and connected to respective ends of said transverse member, a pivoted double ratchet element to engage said transverse member for the purpose described, a pedal operated release therefor, a lever tongue, and a releasable connecting element on the lever tongue constructed to engage the transverse member at different distances from the lever tongue, for the purpose described.

5. In a device of the character described a U-shaped frame work open at the rear, a medial rearward projection from the bight portion of the frame, a guide device mounted thereon having a vertically slidable jack bar therein, movable into close relation to the ground, means to elevate the bar, and a transverse load supporting member mounted on the side members of the frame for longitudinal movement bodily on the frame to include a position forwardly of said jack bar.

6. In a machine of the character described, an open-end frame, a hoist device in the bight thereof, and a travelling load sustaining element movable longitudinally upon the frame, its limit of forward movement being in advance of said hoist device.

7. In a machine of the character described, an open-end frame, a hoist device in the bight thereof, and a travelling load sustaining element movable longitudinally upon the frame, including a transverse member extending across the space within the frame, and offset downwardly below said frame, and the fixed parts of said hoist device.

In testimony whereof I have affixed my signature in presence of two witnesses.

VICTOR E. BEAGLE.

Witnesses:
MARY V. WHITTON,
CARL BUDWESKY.